United States Patent [19]

Satchell et al.

[11] 4,276,250

[45] Jun. 30, 1981

[54] APPARATUS AND METHOD FOR PRODUCING TUBULAR EXTRUSIONS HAVING AXIAL SECTIONS OF MATERIALS HAVING DIFFERENT CHARACTERISTICS

[75] Inventors: Fred E. Satchell, Chesterfield; Joel A. Joslin, Sunset Hills, both of Mo.

[73] Assignee: Sherwood Medical Industries, Inc., St. Louis, Mo.

[21] Appl. No.: 89,567

[22] Filed: Oct. 29, 1979

[51] Int. Cl.³ .............................................. B29D 23/04
[52] U.S. Cl. .................................... 264/167; 264/514;
264/209.1; 425/132; 425/145; 425/326.1;
425/377; 425/380; 425/382 R; 425/463
[58] Field of Search ............... 264/167, 514, 515, 209,
264/173; 425/217, 132, 382 R, 380, 377, 145,
326.1, 463

[56] References Cited

U.S. PATENT DOCUMENTS

| | | | |
|---|---|---|---|
| 2,632,202 | 3/1953 | Haines | 264/515 |
| 2,940,126 | 6/1960 | Sheridan | 264/167 |
| 3,193,878 | 7/1965 | Corbett | 425/382 R |
| 3,272,901 | 9/1966 | Sims | 264/167 |
| 3,416,190 | 12/1968 | Mehnert | 425/382 R |
| 3,453,688 | 7/1969 | Otstot et al. | 425/132 |
| 3,724,985 | 4/1973 | Burlis et al. | 425/132 |
| 3,752,617 | 8/1973 | Burlis et al. | 425/217 |

*Primary Examiner*—Jeffery R. Thurlow
*Attorney, Agent, or Firm*—Paul L. Gardner

[57] ABSTRACT

Apparatuses and methods for simultaneously extruding two lengths of plastic tubing wherein each of said lengths includes alternate axial sections of materials having different characteristics (e.g., a harder material and a softer material). The apparatus includes two extruders which feed plastic extrudate to a dual die head having first and second dies for forming tubular lengths. Valves are operatively associated with each extruder for selectively feeding plastic extrudate from each extruder to either of the dies. The valves are intermittently operated so that during one cycle extrudate from the first extruder is fed to the first die and extrudate from the second extruder is fed to the second die, and during alternate cycles extrudate from the first extruder is fed to the second die and extrudate from the second extruder is fed to the first die. A cooling tank receives the tubular length from the dies for setting the plastic material. A take-off mechanism is associated with each die for pulling the tubular extrudate from the die and through the cooling tank. Tubular extrusions having axial sections of different lengths may be made by setting the extruders to run at different speeds and programming the take-off mechanisms to intermittently operate at different speeds so that each take-off mechanism will operate at a faster speed when the faster-operating extruder is feeding into the die with which the take-off mechanism is associated and at a slower speed when the slower-operating extruder is feeding into that die.

15 Claims, 9 Drawing Figures

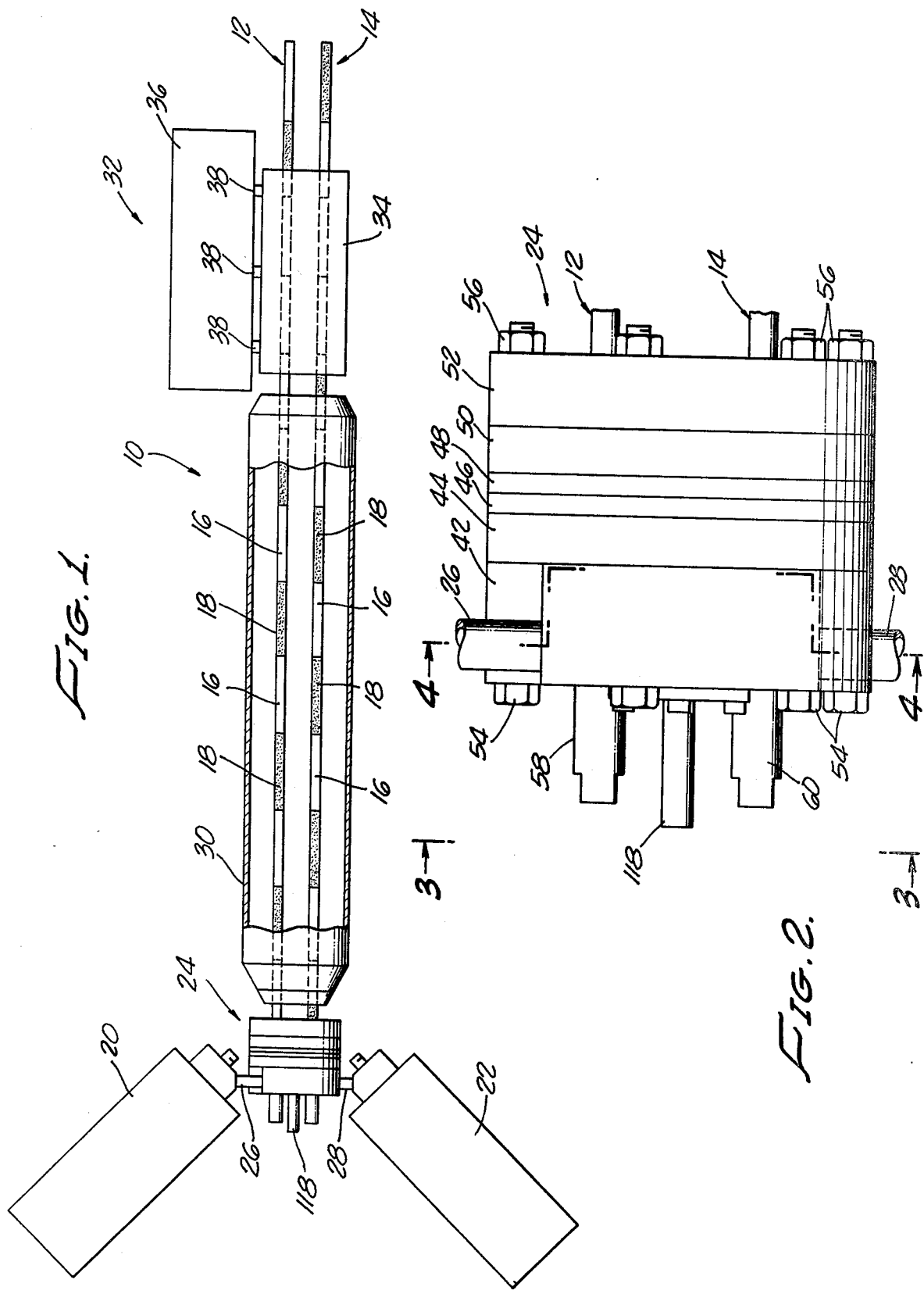

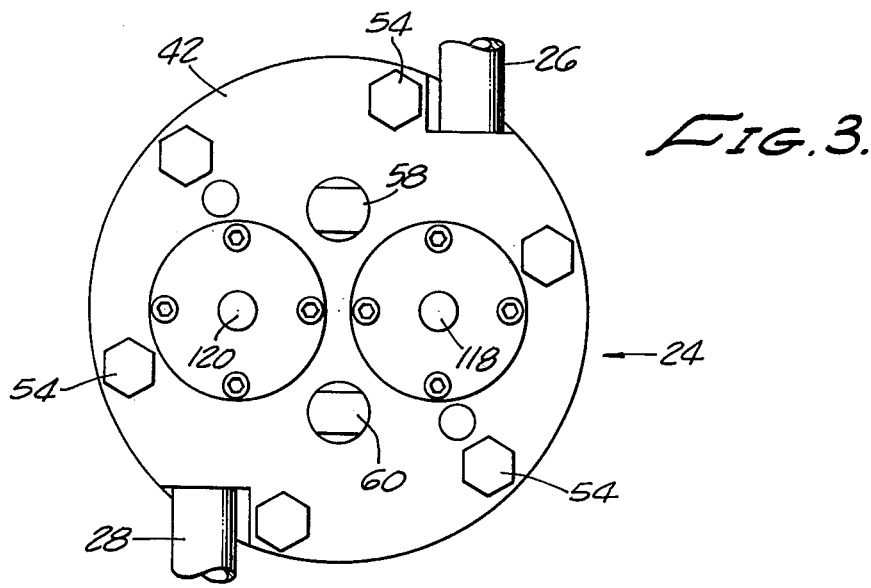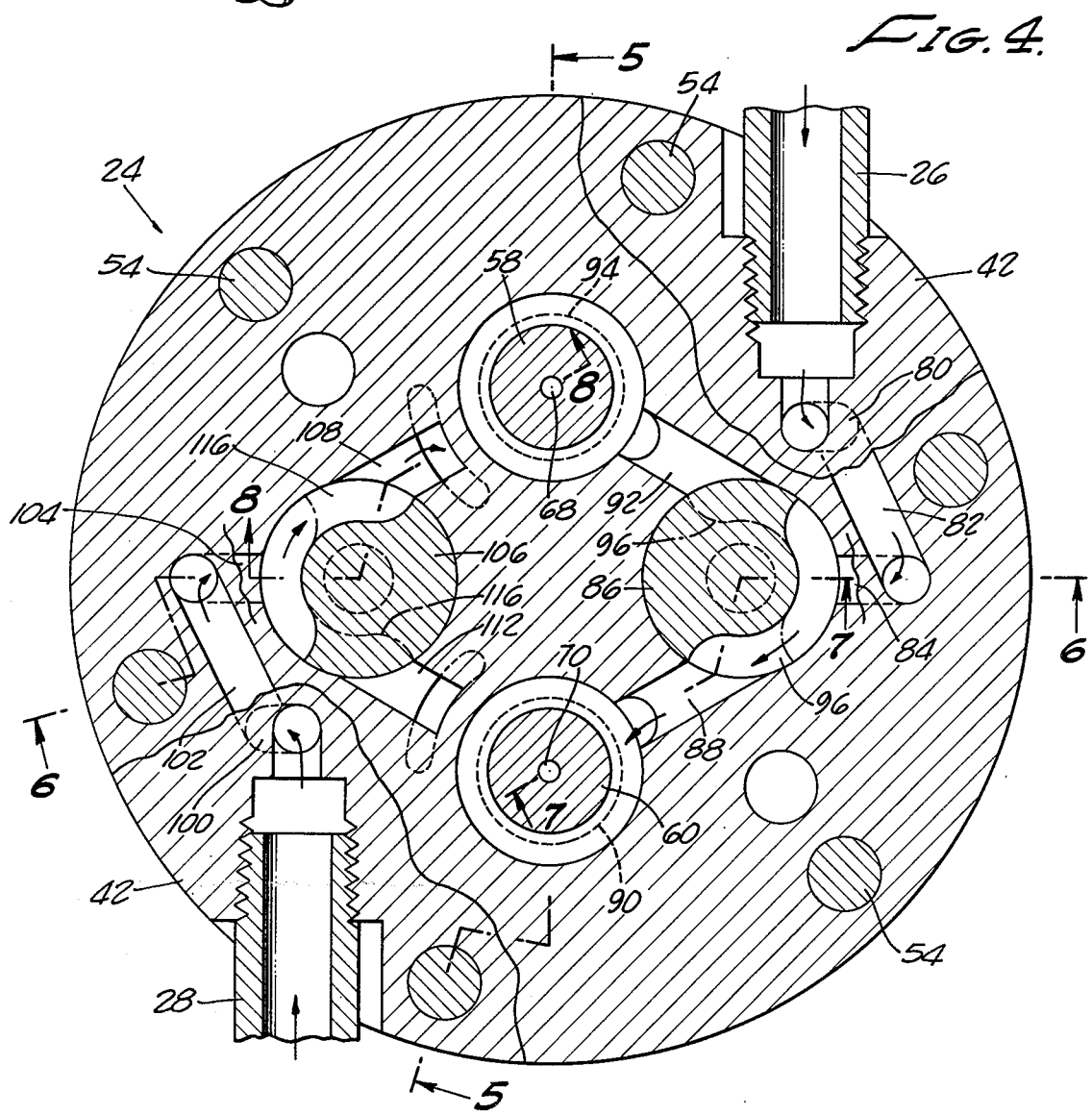

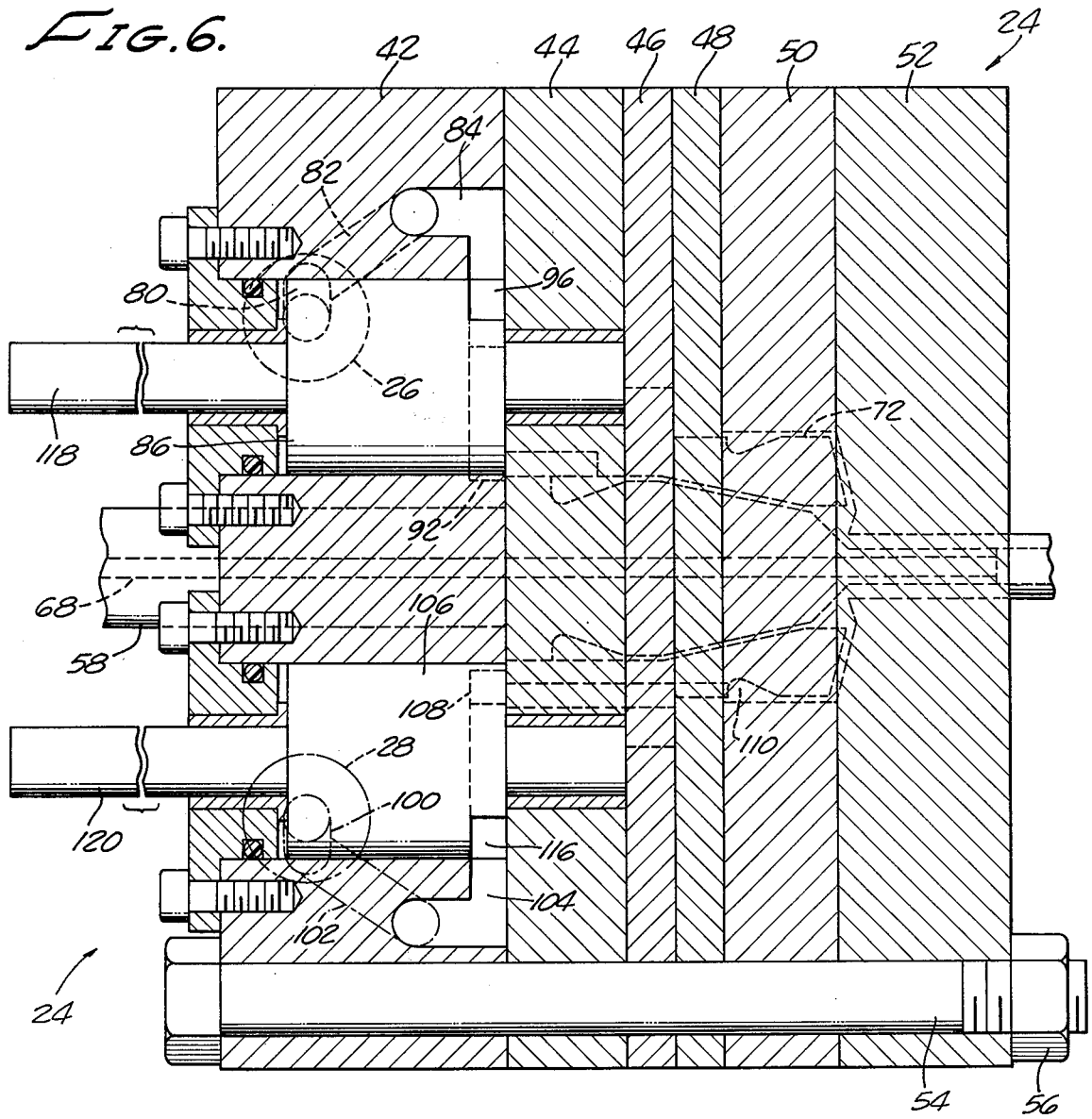

APPARATUS AND METHOD FOR PRODUCING TUBULAR EXTRUSIONS HAVING AXIAL SECTIONS OF MATERIALS HAVING DIFFERENT CHARACTERISTICS

FIELD OF THE INVENTION

The present invention relates to apparatuses and methods for extruding plastic tubing having axial sections of different physical and/or chemical characteristics.

BACKGROUND OF THE INVENTION

In the bio-medical field it is frequently necessary to manufacture plastic tubing having axial sections of different physical and/or chemical characteristics. For example, in the manufacture of suction catheters which are designed to be inserted through a patient's mouth and esophagus and into his lungs, it is desirable to make the forward or distal end of the catheter tube relatively soft to minimize the risk of damage to the patient's esophagus and lungs during insertion, and to make the rear or proximal end of the tube relatively stiff to facilitate insertion and positioning of the tube.

Plastic tubing having axial sections of different characteristics, such as catheter tubes having a relatively soft distal end and a relatively stiff proximal end, for example, is typically made by extruding a continuous length of tubing having intermittent axial sections of different characteristics (e.g., a relatively stiff axial section, followed by a relatively soft axial section, followed by a relatively stiff axial section, followed by a relatively soft axial section, etc.). Thereafter, a section of the catheter tubing having one end relatively stiff and the other end relatively soft is cut from the continuous tube.

Apparatuses for extruding plastic tubing having alternate axial lengths of different materials or characteristics are shown and described in U.S. Pat. Nos. 3,752,617 and 3,724,985.

The apparatus of U.S. Pat. No. 3,752,617 includes two or more extruders that feed different plastic materials to a mixing and extruding die. The apparatus includes a sequencing control for decreasing or interrupting the flow from one extruder and simultaneously increasing the flow from the other extruder and, after a predetermined time interval, reversing this operation to produce a tube having repeating different characteristics. The extruded tube may thereafter be cut into sections, including portions containing each characteristic. While the apparatus of U.S. Pat. No. 3,752,617 has been found to be an acceptable apparatus for extruding plastic tubing having alternate axial sections of different materials and/or characteristics, it is subject to the disadvantage of producing an undesirable amount of waste material. This waste material is produced by each extruder when the other extruder is feeding into the mixing and extruding die.

The extrusion apparatus of U.S. Pat. No. 3,724,985, and particularly the embodiment shown in FIG. 2 of that patent, was designed, in part, to eliminate the production of waste material. To that end, the apparatus of the FIG. 2 embodiment of U.S. Pat. No. 3,724,985 is equipped with accumulator-injector mechanisms, one accumulator-injector being associated with each of the two extruders. Thus, the apparatus of U.S. Pat. No. 3,724,985, as shown in the FIG. 2 embodiment thereof, has two extruders that feed different molten plastic materials to a die, there being provided an accumulator-injector in each of the conduits interconnecting the extruders with the die. The accumulator-injectors are arranged and controlled so that when one extruder is delivering molten material to the die producing a first section of tubing, a first accumulator-injector in the conduit connecting the other extruder with the die withdraws molten plastic from that conduit. Thereafter, the first accumulator-injector injects the previously-withdrawn molten material into the die, thereby eliminating waste, while the second accumulator-injector withdraws the molten material emanating from its associated extruder. The cycle is reversed periodically to produce a tube having sections of different material without requiring a valve for draining the molten material from one of the extruders while the other feeds the die.

The apparatus of U.S. Pat. No. 3,724,985 is subject to several difficulties and deficiencies. In the first place, the apparatus of U.S. Pat. No. 3,724,985 is relatively complex and expensive in that it requires accumulator-injectors along with the extruders and flow dividers and valving to properly regulate the flow of the plastic materials. Another disadvantage of the apparatus of U.S. Pat. No. 3,724,985 is that its utility is limited because of its inability to extrude relatively long lengths of tubing. This inability to extrude longer lengths of tubing arises because the plastic material to be extruded, particularly when the material is a vinyl, must remain in the extruder for extended periods of time, and degradation of the material occurs, i.e., the material burns, discolors and/or decomposes.

OBJECTS AND SUMMARY OF THE INVENTION

In view of the foregoing, it is an object of the present invention to overcome the above-mentioned deficiencies and disadvantages associated with prior art extrusion apparatuses for extruding plastic tubing having alternate axial sections of materials having different characteristics.

A more specific object of the present invention is to provide an improved extrusion apparatus and method for extruding plastic tubing having alternate axial sections of materials having different characteristics which eliminates waste of the plastic extrudate.

Another object of the present invention is to provide an improved extrusion apparatus and method for producing tubular extrusions having axial sections of materials having different characteristics which is less expensive and less complex than the prior art extrusion apparatuses.

A further object of the present invention is the provision of an improved extrusion apparatus which produces tubular extrudate having axial sections of materials of different characteristics which permits the extrusion of tubing whose dual sections are of any desired lengths.

A further object of the present invention is the provision of an improved extrusion apparatus and method for producing tubular extrudate having axial sections of materials having different characteristics at a faster rate than any of the prior art extrusion apparatuses.

The foregoing and other objects of the present invention have been realized by the apparatus and method of the present invention shown. In a preferred embodiment of the present invention, two extruders are provided for feeding plastic extrudate to a dual die head assembly having first and second dies for forming tubular lengths. Valve means are operatively associated with each extruder for selectively feeding plastic extrudate from each extruder to either of the dies. The valve means are intermittently operated so that during one cycle extrudate from the first extruder is fed to the first die and extrudate from the second extruder is fed to the second die, and during alternate cycles extrudate from the first extruder is fed to the second die and extrudate from the second extruder is fed to the first die. A take-off mechanism is associated with each die for pulling tubular extrudate from the die. Tubular extrusions having axial sections of different lengths may be made by setting the extruders to run at different speeds and programming the take-off mechanisms to intermittently operate at different speeds so that each take-off mechanism will operate at a faster speed with the faster-operating extruder is feeding into the die with which the take-off mechanism is associated and at a slower speed when the slower-operating extruder is feeding into that die.

While the embodiments of the present invention show two extruders feeding into a dual-head die assembly, it is contemplated that the concepts of the present invention may be incorporated into a multiple-extruder, multiple die-head assembly apparatus where more than two extruders feed into a die head assembly having more than two dies for producing more than two lengths of tubing having more than two axial sections of materials having different characteristics.

The foregoing and other objects and advantages of the present invention will be appreciated from a review of the preferred embodiments of the present invention shown in the drawings and described below.

BRIEF DESCRIPTION OF THE DRAWINGS

In the drawings:

FIG. 1 is a top plan schematic view of one embodiment of an extrusion assembly constructed in accordance with the teachings of the present invention.

FIG. 2 is a top plan view of the dual die head assembly of the extrusion assembly shown in FIG. 1.

FIG. 3 is a front elevation view of the dual die head assembly shown in FIG. 2, taken along the plane 3—3 of FIG. 2 and looking in the direction of the arrows.

FIG. 4 is a sectional view of the dual die head assembly shown in FIG. 2, taken along the plane 4—4 of FIG. 2 and looking in the direction of the arrows.

FIG. 6 is a sectional view of the dual die head assembly shown in FIGS. 2-5, taken along the plane 6—6 of FIG. 4 and looking in the direction of the arrows.

FIG. 7 is a partial sectional view of a portion of the dual die head assembly shown in FIGS. 2-6, taken along the plane 7—7 of FIG. 4 and looking in the direction of the arrows.

DETAILED DESCRIPTION OF PREFERRED EMBODIMENTS

Figure 5:
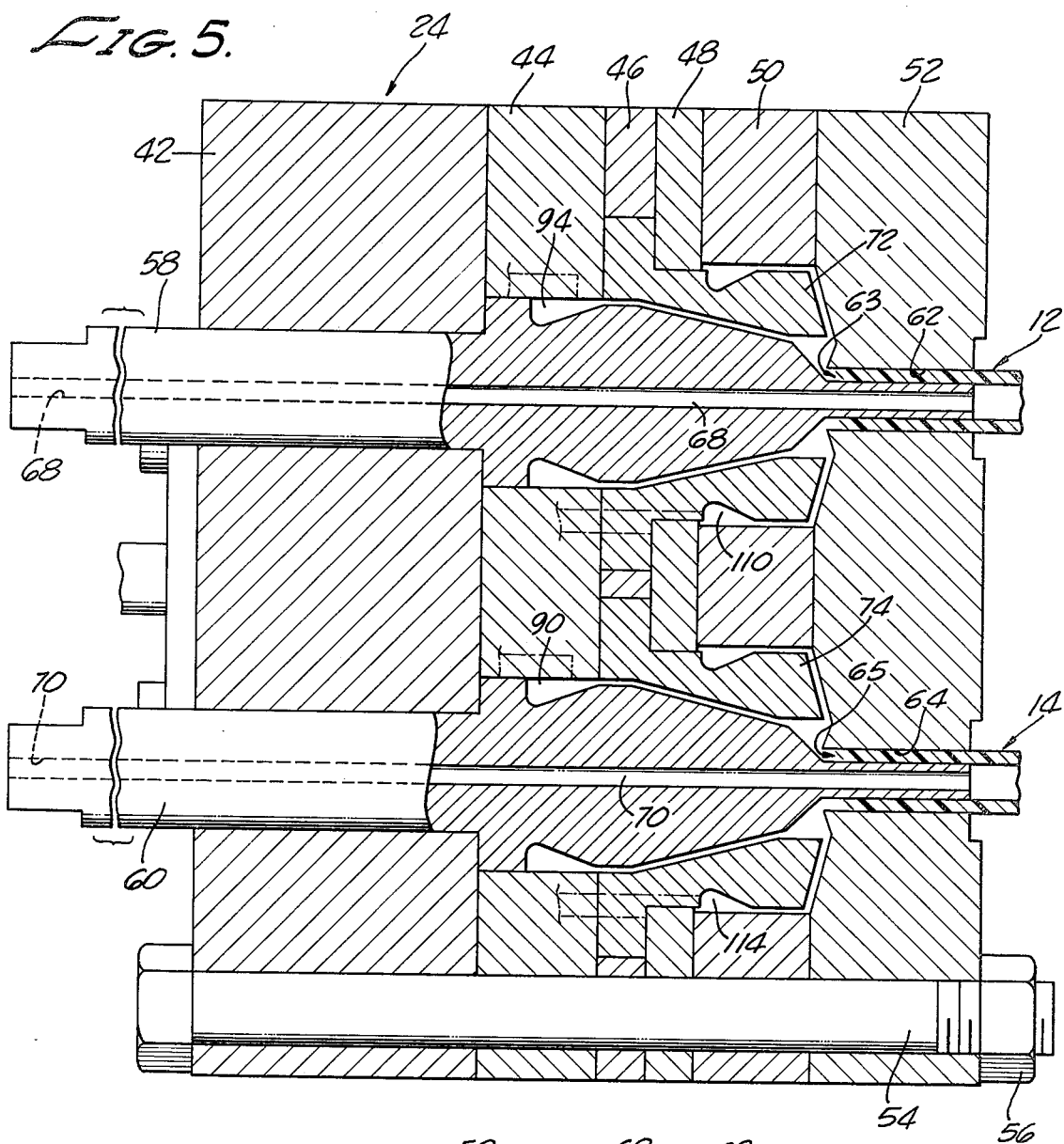
FIG. 5 is a sectional view through the dual die head assembly shown in FIGS. 2, 3 and 4, taken along the plane 5—5 of FIG. 4 and looking in the direction of the arrows.
Figure 8:
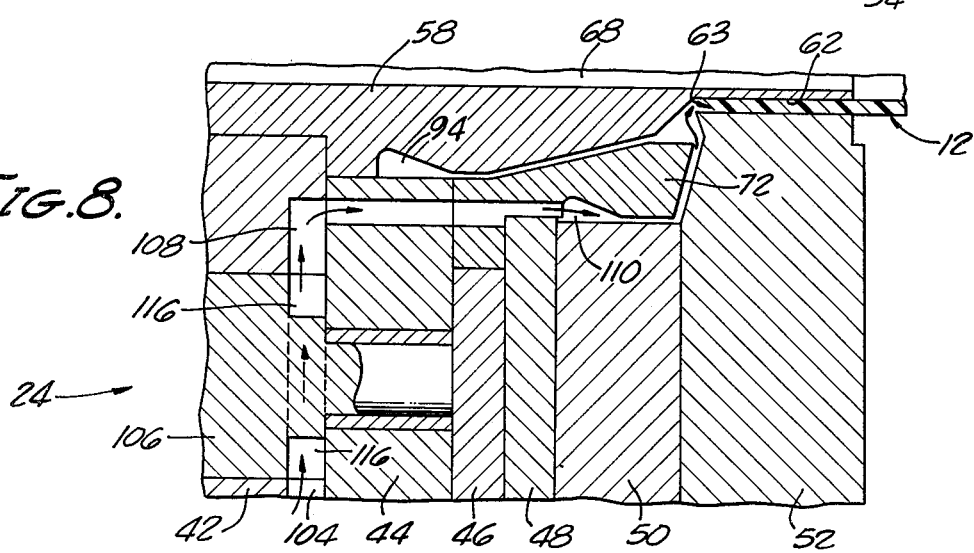
FIG. 8 is a partial sectional view of a portion of the dual die head assembly shown in FIGS. 2-6, taken along the plane 8—8 of FIG. 4 and looking in the direction of the arrows.

FIG. 1 of the drawings illustrates one of the preferred embodiments of an extrusion assembly 10 constructed in accordance with the teachings of the present invention. The assembly 10 shown in FIG. 1 simultaneously produces two continuous lengths 12, 14 of tubular extrusion. Each of the two lengths 12, 14 of tubular extrusions produced by the extrusion assembly 10 shown in FIG. 1 includes alternate axial sections, 16 and 18, of materials having different characteristics.

The extrusion assembly 10 illustrated in FIG. 1 includes a first extruder 20 and a second extruder 22. Both extruders feed plastic extrudate to a dual die head assembly 24. Plastic extrudate is fed from the first extruder 20 to the dual die head assembly 24 through a conduit 26, and plastic extrudate is fed from the second extruder 22 to the dual die head assembly 24 through a conduit 28. The output of the dual die head assembly 24 is the two continuous lengths of tubular extrudate 12 and 14. The material fed from the first extruder 20 produces the axial sections 16 in each of the tubular lengths 12 and 14, and the material from the second extruder 22 produces the axial sections 18 in the tubular lengths 12 and 14.

A cooling tank 30 receives the tubular extrudates 12 and 14 from the dual die head assembly 24 and cools, hardens and sets the tubular extrudates to a solid state.

A take-off assembly 32 pulls the tubular lengths 12 and 14 from the dual-die head assembly 24 and through the cooling tank 30. The take-off assembly 32 includes a pair of vertically spaced endless conveyor belts. The top endless conveyor belt is designated by numeral 34 in FIG. 1. The bottom endless conveyor belt is not seen in FIG. 1; it is positioned directly beneath the top belt 34. The endless conveyor belts 34 are driven from a control housing 36 which includes roller assemblies 38, 38, 38 and a suitable driving mechanism (not shown) for rotating the roller assemblies 38 to drive the belts 34.

Figure 9:
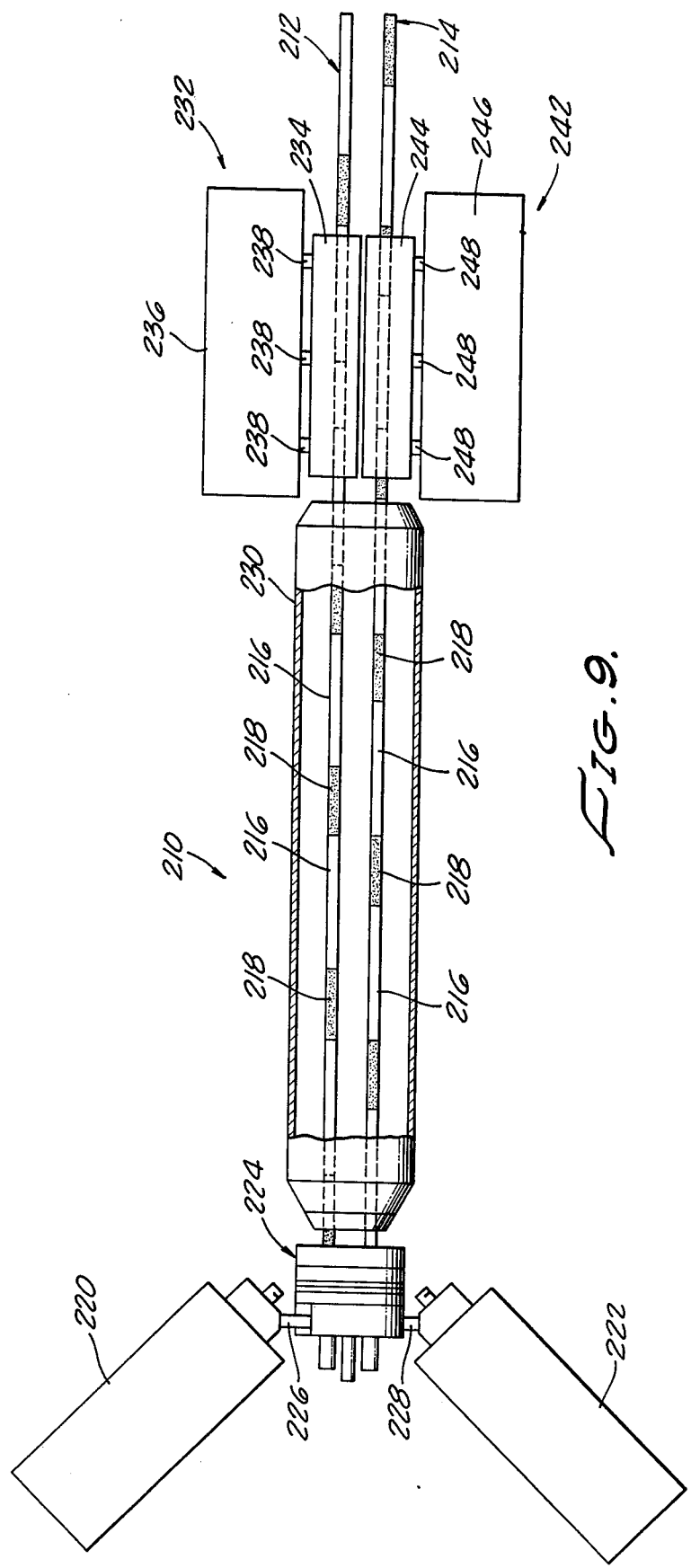
FIG. 9 is a top plan schematic view of another embodiment of an extrusion assembly constructed in accordance with the teachings of the present invention.

It will be noted that the extrusion apparatus 10 illustrated in FIG. 1 is designed to simultaneously produce two continuous lengths of tubing 12 and 14, each of which has alternate axial sections 16 and 18 arranged in a 50—50 ratio. In other words, the alternate axial sections 16 and 18 are of equal length. It is to be noted that in many instances it is desirable to extrude lengths of plastic material having alternate axial sections of different materials arranged in other than a 50—50 ratio. An embodiment of an extrusion assembly constructed in accordance with the teachings of the present invention and designed to produce tubes having alternate axial sections arranged in other than a 50—50 ratio (e.g., where one section is twice the length of each adjacent section) is shown in FIG. 9 and described later in this specification.

The dual die head assembly 24 of the extrusion assembly 10 illustrated in FIG. 1 is shown in detail in FIGS. 2 through 8 of the drawings.

As best shown in FIG. 5, the dual die head assembly 24 includes a housing member 42, three manifolding plates 44, 46 and 48, a spacer plate 50 and a bushing plate 52 all held together in a sandwiched array by means of a plurality of bolts 54 and nuts 56 positioned near the outer periphery of these members.

As best shown in FIG. 5, aligned pairs of holes extend through the housing member 42, the manifolding plates 44, 46 and 48, the spacer plate 50 and the bushing plate 52 for receiving a pair of extrusion pins 58 and 60. The diameter of the forward end of the extrusion pin 58 is smaller than the diameter of the interior peripheral wall 62 which defines one of the pair of holes in the bushing plate to define an annular passage 63 through which plastic is extruded into tubular form 12. Similarly, the diameter of the forward end of the extrusion pin 60 is smaller than the diameter of the interior peripheral wall 64 which defines the other of the pair of holes in the bushing plate 52 to define an annular passage 65 through which plastic is extruded into tubular form 14. Thus, the structure of the bushing plate 52 and the two extrusion pins 58 and 60 which pass through the holes in the bushing plate defined by the interior peripheral walls 62 and 64 constitute a dual die head having two dies through which plastic fed thereto is extruded into tubular forms 12 and 14.

Air passages 68 and 70 extend through the central portions of the extruder pins 58 and 60, respectively. Air may be injected through these passages 68 and 70 to control and maintain the inside diameters of the extruded tubes 12 and 14.

Generally annular flow divider fittings 72 and 74 are provided around the portions of the extrusion pins 58 and 60, respectively, which extend through the manifolding plates 46 and 48 and the spacer plate 50.

The dual die assembly 24 is designed to receive extrudate from both extruders 20 and 22 and to feed the extrudate around the extrusion pins 58 and 60 and through the annular passages 63 and 65 (FIG. 5) to extrude the tubular lengths 12 and 14.

Extrudate from extruder 20 (FIG. 1) is fed through conduit 26 (FIG. 4) and into inlet passages 80, 82 and 84 in the housing member 42. The extrudate from extruder 20 then passes through a valve member 86 and from the valve member 86 to either (1) a passage 88 (FIG. 4) and into the annular space 90 (FIGS. 5 and 7) between the exterior surface of extrusion pin 60 and the interior surface of flow divider fitting 74 and from there to the annular extrusion opening 65 between the forward end of extrusion pin 60 and the interior peripheral wall 64 of the bushing plate 52 (as shown by arrows in FIG. 7), or to (2) a passage 92 (FIG. 4) and to the annular space 94 (FIGS. 5 and 8) between the exterior surface of extrusion pin 58 and the interior surface of flow divider fitting 72 and from there to the annular extrusion opening 63 between the forward end of the extrusion pin 58 and the interior peripheral wall 62 of the bushing plate 52 (see FIG. 5), depending upon the position of the valve member 86.

As best shown in FIGS. 4 and 6, the valve member 86 is a generally cylindrical member having an arcuate groove 96 formed in its forward end. When the valve member 86 is in the position shown in solid lines in FIG. 4, the valve 86 will direct extrudate from extruder 20, conduit 26 and passages 80, 82 and 84 to the passage 88 (FIG. 4) and from there to the annular spaces 90 and 65 (FIGS. 5 and 7) to produce a section 16 of tubular extrudate 14. When the valve member 86 is in the position shown in phantom lines in FIG. 4, the valve 86 will direct extrudate from the extruder 20, conduit 26 and passages 80, 82 and 84 to the passage 92 (FIG. 4) and from there to the annular spaces 94 and 63 (FIGS. 5 and 8) to produce a section 16 of tubular extrudate 12.

Extrudate from extruder 22 (FIG. 1) is fed through conduit 28 (FIG. 4) and into inlet passages 100, 102 and 104 in the housing member 42. The extrudate from extruder 22 then passes through a valve member 106 and from the valve member 106 to either (1) a passage 108 (FIG. 4) and to the annular space 110 (FIGS. 5 and 8) between the exterior surface of flow divider fitting 72 and the interior peripheral walls of manifolding plates 46 and 48 and spacer plate 50 and from there to the annular extrusion opening 63 between the forward end of extrusion pin 58 and the interior peripheral wall 62 of the bushing plate 52 (as shown by arrows in FIG. 8), or to (2) a passage 112 (FIG. 4) and to the annular space 114 (FIGS. 5 and 7) between the exterior surface of flow divider fitting 74 and the interior peripheral walls of manifolding plates 46 and 48 and spacer plate 50 and from there to the annular extrusion opening 65 between the forward end of the extrusion pin 60 and the interior peripheral wall 64 of the bushing plate 52 (see FIG. 5), depending upon the position of the valve member 106.

As best shown in FIGS. 4 and 6, the valve member 106 is a generally cylindrical member having an arcuate groove 116 formed in its forward end. When the valve member 106 is in the position shown in solid lines in FIG. 4, the valve 106 will direct extrudate from extruder 22, conduit 28 and passages 100, 102 and 104 to the passage 108 (FIG. 4) and from there to annular spaces 110 and 63 (FIGS. 5 and 8) to produce a section 18 of tubular extrudate 12. When the valve member 106 is in the position shown in phantom lines in FIG. 4, the valve 106 will direct extrudate from the extruder 22, conduit 28 and passages 100, 102 and 104 to the passage 112 (FIG. 4) and from there to the annular spaces 114 and 65 (FIGS. 5 and 7) to produce a section 18 of tubular extrudate 14.

As best shown in FIG. 6, the valve members 86 and 106 have actuator rods 118 and 120 connected thereto and extending out of the housing member 42 of the die head assembly 24 for selectively and intermittently rotating the valve 86 and 106 to their desired positions (i.e., to either the positions of these valves shown in solid lines in FIG. 4, or to the positions shown in phantom lines in FIG. 4). It is contemplated that the valve actuator rods 118 and 120 may be connected to a suitable actuator mechanism (not shown) for automatically and intermittently switching the positions of the valves between the solid and phantom line positions illustrated in FIG. 4. Switching of the valves may be accomplished mechanically, electrically or pneumatically, as desired.

As shown in FIG. 1, the extrusion assembly 10 is designed to simultaneously produce two lengths of tubular extrudate 12 and 14, each having alternate axial sections 16 and 18 of materials having different characteristics. As shown in FIG. 1, the materials 16 and 18 of different characteristics are arranged in a 50-50 ratio, i.e., where the length of the axial sections 16 and 18 are equal. This is accomplished by intermittently switching the positions of the valves 86 and 106 from the solid line positions shown in FIG. 4 to the phantom line position.

In many cases it is desirable to produce continuous lengths of plastic tube having alternate axial sections of different materials arranged in other than a 50—50 ratio. In other words, it is often desirable to produce plastic tubes having alternate axial sections wherein one section is longer than each adjacent section.

FIG. 9 illustrates an extrusion assembly 210 constructed in accordance with the teachings of the present invention for simultaneously extruding two tubes 212 and 214 wherein each tube has alternate axial sections 216 and 218 of materials of different characteristics, and wherein the alternate axial sections of each tube are of different length. In the exemplary embodiment shown in FIG. 9, each axial section 216 is twice as long as each adjacent axial section 218.

The extrusion assembly 210 illustrated in FIG. 9 includes a first extruder 220 and a second extruder 222. Both extruders feed plastic extrudate to a dual die head assembly 224 which may be identical to the dual die head assembly 224 illustrated in FIGS. 2-8 and described in detail above.

Plastic extrudate is fed from the first extruder 220 to the dual die head assembly 224 through a conduit 226, and plastic extrudate is fed from the second extruder 222 to the dual die head assembly 224 through a conduit 228. The output of the dual die head assembly 224 is the two continuous lengths of tubular extrudate 212 and 214. The material fed from the first extruder 220 produces the axial section 216 in each of the tubular lengths 12 and 14, and the material from the second extruder 222 produces the axial sections 218 in the tubular lengths 212 and 214.

A cooling tank 230 receives the tubular extrudate 212 and 214 from the dual die head assembly 224 and cools, hardens and sets the tubular extrudate to a solid state. A pair of take-off assemblies 232 and 242 pull the tubular lengths 212 and 214, respectively, from the dual die head assembly 224 and through the cooling tank 230.

The take-off assembly 232 includes a pair of vertically-spaced endless conveyor belts. The top endless conveyor belt is designated by numeral 234 in FIG. 9. The bottom endless conveyor belt is not seen in FIG. 9; it is positioned directly beneath the top belt 234. The endless conveyor belts 234 are driven from a control housing 236 which includes roller assemblies 238, 238, 238 and a suitable driving mechanism (not shown) for rotating the roller assemblies 238 to drive the belt 234.

The take-off assembly 242 is identical to the take-off assembly 232, and includes endless conveyor belts 224 driven from a control housing 246 which includes roller assemblies 248, 248, 248 and a suitable driving mechanism (not shown) for rotating the roller assemblies 248 to drive the belts 234.

As noted above, the extrusion assembly 210 illustrated in FIG. 9 is designed to produce tubes 212 and 214 having alternate axial sections 216 and 218 which are not equal to one another. In the embodiment shown in FIG. 9, each axial length of tubing 216 is approximately twice the length of each adjacent axial lengths 218. This is accomplished by running the extruder 220 which produces axial sections 216 at approximately twice the speed as the extruder 222 which produces the axial sections 218.

The take-off assemblies 232 and 244 associated with tubes 212 and 214, respectively, are programmed to alternately run at different speeds, depending upon which of the extruders 220 or 222 is feeding extrudate to the lengths of tubing 212 or 214 with which the particular take-off mechanism 232 or 242 is associated. In other words, when extruder 220 is feeding extrudate to form an axial section 216 in tubular length length 212 and the extruder 222 is feeding extrudate to form an axial section 218 in tubular length 214, the take-off assembly 232 will operate at approximately twice the speed as take-off assembly 242 in order to pull the tubular length 212 from the dual die head assembly 224 and through the cooling tank 230 at a speed compatible with the speed at which extruder 220 is feeding extrudate to the dual die head assembly 224. Similarly, when the valves in the dual die head assembly 224 are positioned so that extruder 220 is feeding extrudate to form an axial section 216 in the tubular length 214 and the extruder 222 is feeding extrudate to form an axial section 218 in the tubular length 212, the take-off assembly 242 will operate at approximately twice the speed of take-off assembly 236.

It is to be noted that the specific embodiments of the present invention shown in the drawings and described above are exemplary only, and it is contemplated that numerous modifications, changes and/or additions may be made to the apparatuses and methods of the present invention without departing from the spirit and scope of the invention.

Accordingly, it is intended that the scope of this patent be limited only by the scope of the appended claims.

We claim:

1. Apparatus for substantially simultaneously producing first and second lengths of material with each length of material having alternate axial sections of material of different characteristics; said apparatus including:
    first and second material producing means;
    first and second die means; and
    valve means intermittently operable for first directing material from said first material-producing means to said first die means and material from said second material producing means to said second die means and thereafter directing material from said first material-producing means to said second die means and material from said second material producing means to said first die means.

2. Apparatus according to claim 1, and further including take-off means for pulling lengths of material from said die means.

3. Apparatus according to claim 2, wherein said take-off means includes a first take-off means for pulling a first length of material from said first die means and a second length of material from said second die means.

4. Apparatus according to claim 1, wherein said first and second material-producing means comprise first and second extruders for feeding extrudate to said first and second die means.

5. Apparatus according to claim 4, wherein said extruders operate at different speeds, whereby one of said extruders feeds extrudate to said die means at a faster rate than said other extruder.

6. Apparatus according to claim 5, and further including first and second take-off means for pulling a first length of material from said first die means and a second take-off means for pulling a second length of material from said second die means; said first and second take-off means operating at different speeds so as to pull said first and second lengths of material from said first and second die means at a faster rate when the faster operating extruder is feeding extrudate to said die means.

7. Apparatus for substantially simultaneously extruding first and second plastic tubes, each plastic tube having alternate axial sections of plastic material having different characteristics; said apparatus comprising:
    first and second die means;
    first and second extruders for feeding plastic material to said first and second die means;
    first valve means operatively associated with said first extruder for delivering plastic material from said first extruder to either said first die means or said second die means, and second valve means operatively associated with said second extruder for delivering plastic material from said second extruder to either said second die means or said first die means; and said first and second valve means being operable so that when said first valve means is directing plastic material from said first extruder to said first die means said second valve means is directing plastic material from said second extruder to said second die means, and when said first valve means is directing plastic material from said first extruder to said second die means said second valve means is directing plastic material from said second extruder to said first die means.

8. Apparatus according to claim 7, and further including take-off means for pulling lengths of plastic material from said first and second die means.

9. Apparatus according to claim 8, wherein said take-off means includes a first take-off means for pulling a first length of material from said first die means and a second length of material from said second die means.

10. Apparatus according to claim 7, wherein said extruders operate at different speeds, whereby one of said extruders feeds extrudate to said die means at a faster rate than said other extruder.

11. Apparatus according to claim 10, and further including first and second take-off means for pulling a first length of material from said first die means and a second take-off means for pulling a second length of material from said second die means; said first and second take-off means operating at different speeds so as to pull said first and second lengths of material from said first and second die means at a faster rate when the faster operating extruder is feeding extrudate to said die means.

12. A method for substantially simultaneously extruding first and second plastic tubes, each plastic tube having alternate axial sections of plastic material having different characteristics; said method comprising the steps of:
(1) feeding plastic material from a first material producing means to a first die means while substantially simultaneously feeding plastic material from a second material producing means to a second die means;
(2) thereafter feeding plastic material from the first material producing means to the second die means while substantially simultaneously feeding plastic material from the second material producing means to the first die means; and
(3) repeating steps (1) and (2) to produce two plastic tubes, each having alternate axial sections of plastic material fed from the first and second material producing means.

13. The method of claim 12, and further comprising the steps of:
pulling plastic tubing from said first die means; and
pulling plastic tubing from said second die means.

14. A method for substantially simultaneously extruding first and second plastic tubes, each plastic tube having alternate axial sections of plastic material having different characteristics; said method comprising the steps of:
(1) feeding plastic material from a first material producing means to a first die means at one rate while substantially simultaneously feeding plastic material from a second material producing means to a second die means at a rate slower than said one rate;
(2) thereafter feeding plastic material from the first material producing means to the second die means at one rate while substantially simultaneously feeding plastic material from the second material producing means to the first die means at a rate slower than said one rate; and
(3) repeating steps (1) and (2) to produce two plastic tubes, each having alternate axial sections of plastic material fed from the first and second material producing means.

15. The method of claim 14, and further comprising the steps of:
pulling plastic tubing from said first die means at a rate corresponding to the rate at which plastic material is being fed to said first die means from said first or second material producing means; and
pulling plastic tubing from said second die means at a rate at which plastic material is being fed to said second die means from said second or said first material producing means.

* * * * *